United States Patent [19]

Utsugi et al.

[11] Patent Number: 5,093,691

[45] Date of Patent: Mar. 3, 1992

[54] ORGANIC THIN-FILM EL DEVICE

[75] Inventors: Koji Utsugi; Masayasu Ishiko, both of Tokyo, Japan

[73] Assignee: NEC Corporation, Tokyo, Japan

[21] Appl. No.: 525,398

[22] Filed: May 18, 1990

[30] Foreign Application Priority Data

May 19, 1989 [JP] Japan ................ 1-124202

[51] Int. Cl.⁵ ............................. H01L 27/12
[52] U.S. Cl. ................................. 357/4; 357/8; 313/504; 313/506
[58] Field of Search ............. 357/8, 504, 4; 313/503, 313/506, 507

[56] References Cited

U.S. PATENT DOCUMENTS

| | | | |
|---|---|---|---|
| 4,164,431 | 8/1979 | Tang | 357/8 |
| 4,611,385 | 9/1986 | Forrest et al. | 357/8 |
| 4,720,432 | 1/1988 | Van Slyke et al. | 357/8 |
| 4,741,976 | 5/1988 | Eguchi et al. | 313/504 |
| 4,779,166 | 10/1988 | Tanaka et al. | 362/32 |
| 4,885,211 | 12/1989 | Tang et al. | 357/8 |

FOREIGN PATENT DOCUMENTS

| | | | |
|---|---|---|---|
| 0031065 | 7/1981 | European Pat. Off. | 357/8 |
| 2636421 | 2/1978 | Fed. Rep. of Germany | 357/8 |

OTHER PUBLICATIONS

Adachi et al., "Blue Light-Emitting Organic Electroluminescent Devices", *Applied Physics Letters*, 56(9), Feb. 26, 1990, pp. 799-800.

Primary Examiner—Andrew J. James
Assistant Examiner—Courtney A. Bowers
Attorney, Agent, or Firm—Leydig, Voit & Mayer

[57] ABSTRACT

An organic thin-film electroluminescence (=EL) device is provided. This device includes as a main constituent of an organic luminescent thin-film layer sandwiched between a couple of electrodes at least one of which is transparent, a naphthalimide derivative represented by the formula (I):

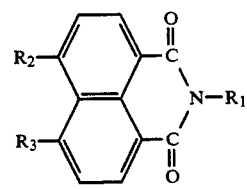

wherein $R_1$, $R_2$ and $R_3$ are identical or different from each other and are selected from the group consisting of hydrogen, an alkyl group, an aryl group, a substituted alkyl group, a substituted aryl group, an alkoxyl group, an amino group and an acylamino group.

5 Claims, 1 Drawing Sheet

ORGANIC THIN-FILM EL DEVICE

BACKGROUND OF THE INVENTION

1. Field of the Invention

The present invention relates to an organic thin-film electroluminescence (=EL) device for use particularly in a planar light source, a display or the like.

2. Description of the Prior Art

An EL device fabricated by an organic substance as material has been expected to realize a low-cost large-surface multicolored display device. For example, a condensed multi-ring aromatic compound such as anthracene, perylene or the like is made into a thin film an a Langmuir-Blodgett (LB) method, a vacuum evaporation plating method or the like to produce a DC driving organic thin-film EL device and study its luminescent properties. Such prior art organic thin-film EL devices, however, require high driving voltage, whereas their luminous brightness and luminous efficiency are inferior to those of inorganic thin-film EL devices. Further, it shows considerable degradation of luminescent properties and, thus is far remote from practical level.

Recently, however, a new type of an organic thin-film EL device having a double-layer structure of organic thin films was reported to attract keen attention [Applied Physics Letters, Vol. 51, No. 12, pages 913-915 (1987)]. According to the report, this organic thin-film EL device has a double-layer structure as shown in the attached FIG. 2 comprising an organic luminescent thin-film layer 24 fabricated by a strongly fluorescent metal chelate complex and an organic hole injection layer 23 fabricated by an amine series compound, which layers are sandwiched between an indium-tin-oxide (ITO) transparent electrode 22 and a backplate 25, and owing to such double-layer structure enables the device to obtain bright green luminescence. In effect, brightness of some hundreds $cd/m^2$ reportedly was obtained at DC driving voltage of 6-7 V, and the maximum brightness 1,000 $cd/m^2$ at 10 V. Further, it shows performance of the maximum luminous efficiency 1.5 lm/W, which is near to practical level.

This device however is of a type driven by a DC current and so, in order to gain such high brightness, requires stable flow of DC current larger than 100 $mA/cm^2$. The organic luminescent layer of the material used heretofore is not satisfactory to realize such stable flow of a large current, owing to degradation of the luminescent layer by electric conduction and morphological change in the luminescent thin-film which cause reduction of electron and hole injection into the organic luminescent layer.

SUMMARY OF THE INVENTION

An object of the present invention therefore is to present an improved organic thin-film EL device having an increased luminous efficiency and a reduced degradation rate of luminous brightness.

Thus the present invention provides an organic thin-film EL device comprising at least one organic luminescent thin-film layer sandwiched between a couple of electrodes at least one of which electrodes is transparent; said organic luminescent thin-film layer contains as a main constituent a naphthalimide derivative represented by the formula (I):

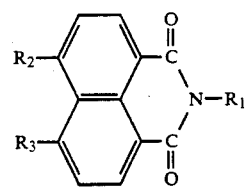

wherein $R_1$, $R_2$ and $R_3$ are identical or different from each other and are selected from the group consisting of hydrogen, an alkyl group, an aryl group, a substituted alkyl group, a substituted aryl group, an alkoxyl group, an amino group and an acylamino group.

The main feature of the present invention resides in the use of the naphthalimide derivative of the formula (I) as above for a luminescent layer and so there are no substantial limitations to materials which constitute elements other than the luminescent layer.

Some examples of fabrication of the organic thin-film EL device of the present invention are illustrated in the attached FIGS. 1-3. In the example of FIG. 1, only an organic luminescent thin-film layer 14 is sandwiched between an ITO transparent electrode 12 on a glass substrate 11 and a backplate 15. In the example of FIG. 2, an organic hole injection layer 13 is additionally placed between the ITO transparent electrode 12 and the organic luminescent thin-film layer 14 to make up a double-layer structure. In the example of FIG. 3, an organic electron injection layer 16 is placed between the organic luminescent thin-film layer 14 and the backplate 15, in addition to the organic hole injection layer 13 shown in FIG. 2. In any of these examples, it is possible to obtain a device having a very excellent luminous efficiency by using the above mentioned naphthalimide derivative for the organic luminescent thin-film layer in accordance with the present invention.

It is particularly effective to employ as the material of the hole injection layer 13, as shown in FIGS. 2 and 3, provided on the ITO electrode 12, which is transparent and is a hole injection electrode, an aromatic tertiary amine series compound or a phthalocyanine series compound, which shows property of a p-type semiconductor, because efficiency of hole injection from the ITO electrode 12 and transport efficiency in the hole injection layer 13 are increased. Similarly, it is possible and effective to increase efficiency of electron injection from the backplate 15 and transport efficiency in the electron injection layer 16.

The device of the present invention thus includes also cases wherein an organic electric-charge transporting thin-film layer, which is for example the above mentioned hole or electron injection layer or both of them, is laminated with the organic luminescent thin-film layer to give a double-layer or triple-layer structure.

As for the transparent electrode, it is possible to use any of ordinarily used one, for example, ITO, $SnO_2$:Sb, ZnO:Al, Au, etc. may be mentioned. As for the backplate, Tn, Mg, Ag, Mg:Ag, etc. may be mentioned.

As for the naphthalimide derivative to be used in accordance with the present invention, it is possible to use the following compounds, but these compounds are only for examples and by no means limits the scope of the derivatives:

N-(2',4'-xylyl)-4-aminonaphthalimide,
4-aminonaphthalimide,
N-methyl-4-aminonaphthalimide, N-ethyl-4-aminonaphthalimide,
N-propyl-4-aminonaphthalimide,
N-n-butyl-4-aminonaphthalimide,
4-acetylaminonaphthalimide,
N-methyl-4-acetylaminonaphthalimide,
N-ethyl-4-acetylaminonaphthalimide,
N-propyl-4-acetylaminonaphthalimide,
N-n-butyl-4-acetylaminonaphthalimide,
N-methyl-4-methoxynaphthalimide,
N-ethyl-4-methoxynaphthalimide,
N-propyl-4-methoxynaphthalimide,
N-n-butyl-4-methoxynaphthalimide,
N-methyl-4-ethoxynaphthalimide,
N-ethyl-4-ethoxynaphthalimide,
N-propyl-4-ethoxynaphthalimide, and
N-n-butyl-4-ethoxynaphthalimide.

In accordance with the present invention, it becomes possible to improve luminous efficiency 1.5 to 2 times of that of the prior art organic thin-film EL device, as shown in the embodiments of the present invention shown hereinafter.

DESCRIPTION OF THE PREFERRED EMBODIMENT

The present invention will be explained below further in detail with respect to its embodiment shown as an working example.

EXAMPLE 1

As for the organic luminescent material, a naphthalimide derivative UFG-1, a product of Nippon Kayaku Co., Ltd., Japan was used.

Figure 1:
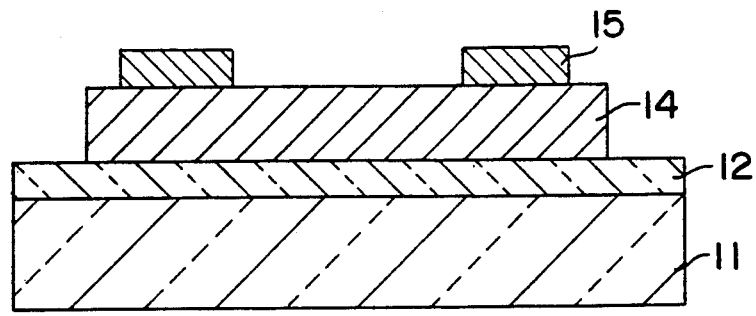
FIGS. 1–3 respectively show cross sectional views of some examples of organic thin-film EL devices having various structures, to which the present invention can be applied.
Figure 2:
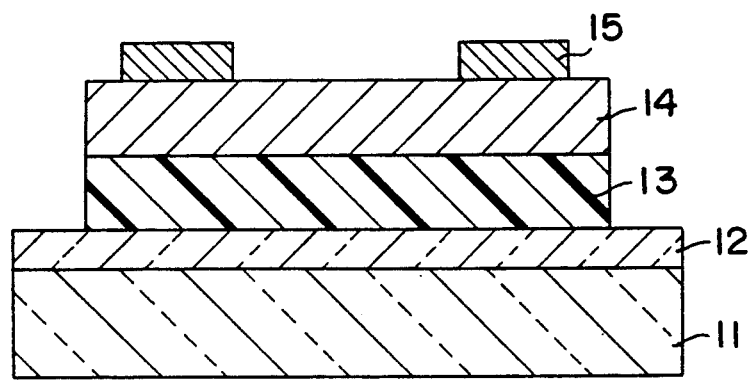
Figure 3:
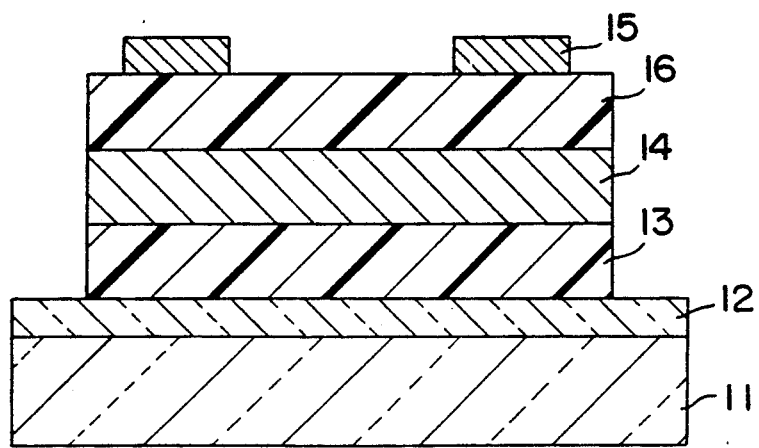

As shown in FIG. 2, an ITO transparent electrode 12 was formed on a glass substrate 11, and then a thin film of 500 Å in thickness of 1,1-bis(4-N,N-ditolylaminophenyl)cyclohexane and a thin film of 1,000 Å in thickness of said naphthalimide were plated thereon by vacuum evaporation in $10^{-7}$ Torr. vacuum to form a hole injection layer 13 and an organic luminescent thin-film layer 14 according to the present invention, respectively. Finally, a backplate 25 was formed thereon by depositing indium to a thickness of 1,500 Å by an electron beam source evaporation plating method to obtain an organic thin-film EL device.

The obtained device was tested to determine its luminescent properties in dry nitrogen atmosphere. It was found that bright yellow luminescence of 200 cd/m$^2$ was obtained by applying DC voltage of about 7 V. This corresponds to improvement of luminous brightness and efficiency for 1.5 to 2 times of those of a prior art device. According to aging tests performed under the condition to apply an electric current density of 0.5 mA/cm$^2$, the above device showed a half-value period as to brightness of not less than 500 hours, whereas the prior art device showed that of 100 to 300 hours.

As explained above, the present invention presents an organic thin-film EL device having considerably improved luminescent properties and reliability, which is very effective for use as a thin-film luminescent device operative by a low driving voltage and thus is highly valuable in the industry.

We claim:

1. An organic thin-film EL device comprising at least one organic luminescent thin-film layer sandwiched between a couple of electrodes at least one of which electrodes is transparent; said organic luminescent thin-film layer contains as a main constituent a naphthalimide derivative represented by the formula (I):

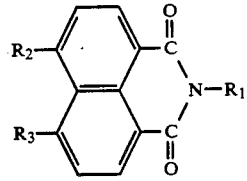

wherein $R_1$, $R_2$ and $R_3$ are identical or different from each other and are selected from the group consisting of hydrogen, an alkyl group, an aryl group, a substituted alkyl group, a substituted aryl group, an alkoxyl group, an amino group and an acylamino group.

2. The organic thin-film EL device according to claim 1, which includes at least one organic electric-charge transporting thin-film layer sandwiched between the electrodes, in addition to the at least one organic luminescent thin-film layer, to give a multilayer structure.

3. The organic thin-film EL device according to claim 2, wherein the at least one organic electric-charge transporting thin-film layer consists of a hole injection layer made of an organic hole transporting material to give a double-layer structure.

4. The organic thin-film EL device according to claim 2, wherein the at least one organic electric-charge transporting thin-film layer consists of a hole injection layer made of an organic hole transporting material and an electron injection layer made of an organic electron transporting material to give a triple-layer structure.

5. The organic thin-film EL device according to claim 1 wherein the naphthalimide derivative is selected from the group consisting of:
N-(2',4'-xylyl)-4-aminonaphthalimide,
4-aminonaphthalimide,
N-methyl-4-aminonaphthalimide,
N-ethyl-4-aminonaphthalimide,
N-propyl-4-aminonaphthalimide,
N-n-butyl-4-aminonaphthalimide,
4-acetylaminonaphthalimide,
N-methyl-4-acetylaminonaphthalimide,
N-ethyl-4-acetylaminonaphthalimide,
N-propyl-4-acetylaminonaphthalimide,
N-n-butyl-4-acetylaminonaphthalimide,
N-methyl-4-methoxynaphthalimide,
N-ethyl-4-methoxynaphthalimide,
N-propyl-4-methoxynaphthalimide,
N-n-butyl-4-methoxynaphthalimide,
N-methyl-4-ethoxynaphthalimide,
N-ethyl-4-ethoxynaphthalimide,
N-propyl-4-ethoxynaphthalimide, and
N-n-butyl-4-ethoxynaphthalimide.

* * * * *